Dec. 6, 1949 K. L. MAGEE 2,490,143
WINDROW PICKUP AND DISTRIBUTING APPARATUS
Filed Aug. 24, 1944
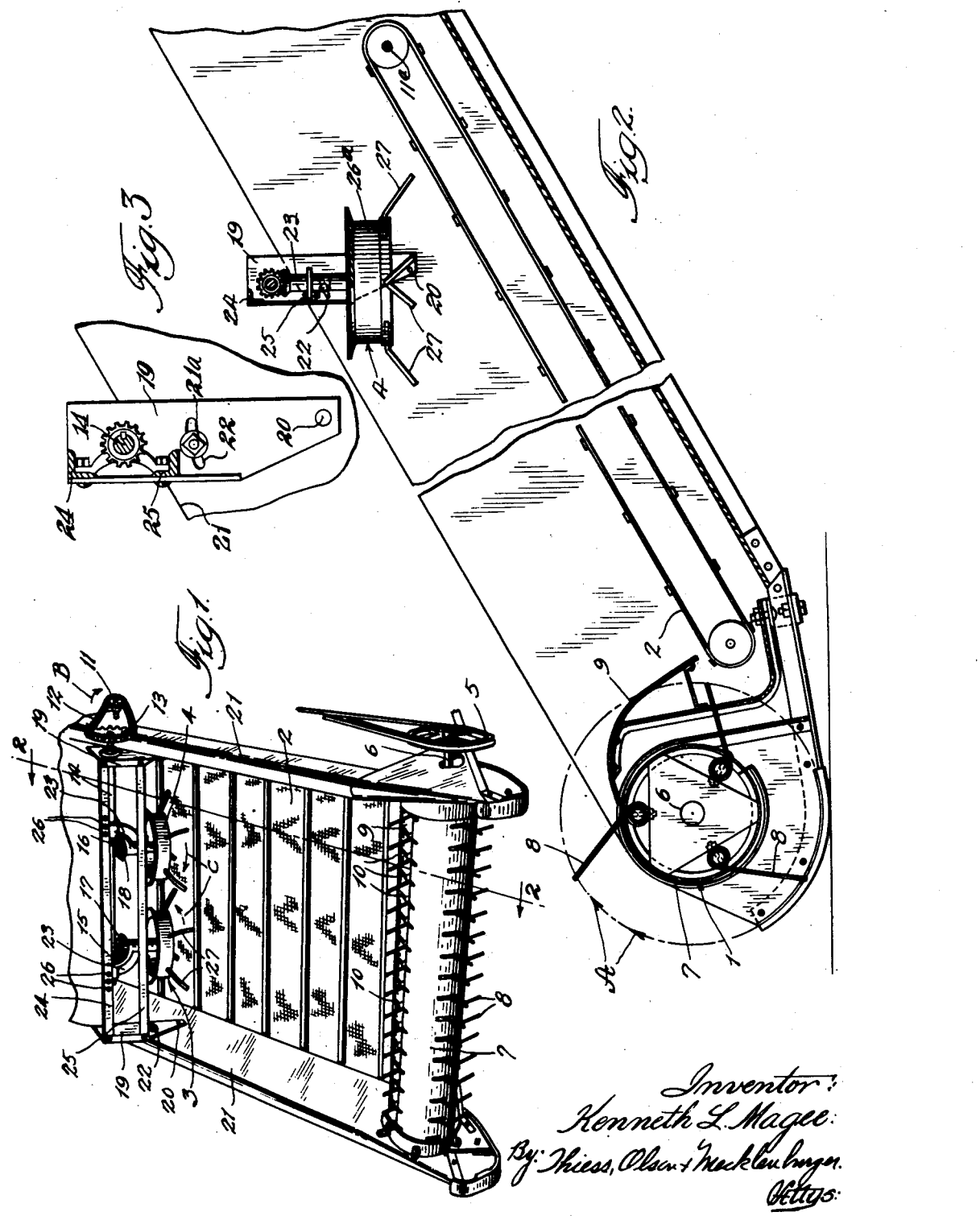
Inventor:
Kenneth L. Magee
By: Thiess, Olsen + Mecklenburger
Attys.

Patented Dec. 6, 1949

2,490,143

UNITED STATES PATENT OFFICE 2,490,143

WINDROW PICKUP AND DISTRIBUTING APPARATUS

Kenneth L. Magee, Burlington, Iowa, assignor to J. I. Case Company, Racine, Wis., a corporation of Wisconsin Application August 24, 1944, Serial No. 550,941

5 Claims. (Cl. 56—351)

My invention relates to a windrow pickup and distributing apparatus.

Windrowing, or swathing, is a method whereby crops can be threshed by a combine moving over the field under conditions where combining direct from the standing stalk may not be considered practical.

The windrowing method consists of cutting the crop and in the same operation gathering it into a windrow where it cures into proper condition for threshing. It is then taken up by a pickup attachment on the combine and threshed, separated, and cleaned as usual.

After the windrows have been made and before the cut material has cured sufficiently for handling by the combine, it may become somewhat matted due to rain or other causes, rendering it difficult for the windrow pickup of a combine to properly deliver the cut material to the threshing part of the combine.

One of the objects of my invention is to provide a windrow pickup for combines with improved apparatus for loosening up the cut material after it has been picked up and delivered to the conveyor by the pickup rake and for delivering it in the desired manner to the self feeder of the combine.

Further objects and advantages of the invention will be apparent from the description and claims.

In the drawings,

Figure 1 is a perspective view showing a pickup and distributing apparatus;

Fig. 2 is a vertical longitudinal section of the pickup and distributing mechanism substantially on the line 2—2 of Fig. 1, and Fig. 3 is an enlarged detail elevation showing a pivotal bracket.

Referring to the drawings, the construction shown comprises a rotating pickup rake 1 rotating in the direction shown by the arrows A in Fig. 2 for picking up the cut crop and depositing it on the endless conveyor 2 by which it is carried upwardly until it is engaged by the two rotating distributing spiders 3 and 4 adjacent the upper elevated end of the conveyor which cooperates with the conveyor to deliver the cut and redistributed material to the feeder (not shown) to be passed along to the threshing mechanism of the combine. The rotatable pickup rake is driven in the direction of the arrows by means of a pulley 5 mounted on the end of the shaft 6 of the pickup drum 7 on which the pickup teeth 8 are mounted. A suitable slotted stripper 9 is provided having slots 10 into which the pickup teeth enter, said stripper serving to remove the cut material from the pickup teeth and deliver it to the endless conveyor. A pickup drum of this general nature is shown and described in the patent to Krause No. 2,324,261.

The two spiders 3 and 4 are driven in opposite directions by means of a sprocket 11 on the conveyor drive shaft 11ª which rotates in the direction of the arrow B (Fig. 1), a sprocket chain 12 running over this sprocket, a sprocket wheel 13 engaged by the sprocket chain, a shaft 14 on which this sprocket wheel is mounted, two reversely facing bevel gears 15 and 16 slidable and nonrotatable on this cross shaft and two bevel gears 17 and 18 meshing with the two bevel gears 15 and 16, respectively, and mounted on the shafts on which the spiders 3 and 4 are mounted. The axes of these spiders are so spaced and the legs extend in such directions that they overlap and interpose with respect to each other as the spiders rotate.

In order to change the position of the spiders with respect to the conveyor 2, the cross shaft may be mounted in suitable bearings carried by brackets 19 which are pivotally and adjustably mounted at 20 on the side members 21 of the conveyor chute to change the inclination of the axes of the spiders with respect to the plane of the upper run of the conveyor 2. The brackets 19 may be held in adjusted position by means of nuts threaded on the end of the studs 21ª extending through slots 22 in the brackets. When the nuts are loosened the brackets 19 may be adjusted about the pivot 20, retightening of the nuts locking the brackets 19 in their new positions. In order to adjust the distance between the axes of the spiders 3 and 4, the bearing brackets 23 on which the bevel gears 15, 16, 17 and 18 are mounted may be adjusted laterally on cross bars 24 and 25 extending between and secured to the brackets. This adjustment of the distance between the axes of the spiders is accomplished by means of securing bolts engaging the brackets which may be secured in any one of a number of holes 26 in the supporting cross bar 24. The gears 15 and 16 may be slidable but non-rotatable on the shaft 14 to enable this lateral adjustment. Each spider comprises a hollow metal shell 26ª on which the tine-like legs 27 of the pitchfork-like spider are mounted. This shell serves to prevent the cut material from wrapping around the shafts on which the spiders are mounted.

In use, the combine is guided so that the windrow pickup will travel along the line of the windrow. The rotary pickup rake 1, rotating in the direction of the arrows in Fig. 2, will pick up the material in the windrow and deliver it to the conveyor 2. The conveyor 2 carries the cut material upwardly and rearwardly until it is engaged by the two rotating feeding spiders 3 and 4 which cooperate with the conveyor to loosen up the cut material and deliver it to the feeder. Due to their direction of rotation, the spiders will tend to draw the cut material from the sides of the conveyor 2 and deliver it to the central portion of the feeder. By means of the angular adjustment of the brackets 19 and the lateral adjustment of the brackets 23, the manner of delivery of the material to the feeder may be adjusted to suit different conditions.

Further modifications will be apparent to those skilled in the art and it is desired, therefore, that the invention be limited only by the scope of the appended claims.

Having thus described my invention, what I claim and desire to secure by Letters Patent is:

1. A pickup and feeding apparatus for use with a combine for picking up a windrow, swath or shock of the cut crop from the ground and feeding it to the threshing apparatus comprising an upwardly and rearwardly extending belt-like conveyor for receiving the cut material from the pickup apparatus and delivering it to be threshed, and means adjacent the elevated delivery end of the conveyor for redistributing the cut material on the conveyor for delivery from the conveyor comprising a pair of spiders having tine-like legs extending outwardly therefrom above the conveyor adjacent its upper end, said spiders being mounted in the same plane at an angle to the plane of the conveyor, whereby the tine-like legs engage and loosen the material on the conveyor and assist in conveying it toward the threshing apparatus.

2. A pickup and feeding apparatus for use with a combine for picking up a windrow, swath or shock of the cut crop from the ground and feeding it to the threshing apparatus comprising an upwardly and rearwardly extending belt-like conveyor for receiving the cut material from the pickup apparatus and delivering it to be threshed, and means adjacent the elevated delivery end of the conveyor for redistributing the cut material on the conveyor for delivery from the conveyor comprising a pair of spiders having tine-like legs extending outwardly therefrom above the conveyor adjacent its upper end, said spiders being mounted in the same plane at an angle to the plane of the conveyor such that the edges of said spiders nearest to the delivery end of the conveyor are closer to the conveyor than the edges of the spiders furthest from said delivery end of the conveyor, whereby the legs of the spiders engage and loosen the material on the conveyor and assist in conveying it toward the threshing apparatus.

3. A pickup and feeding apparatus for use with a combine for picking up a windrow, swath or shock of the cut crop from the ground and feeding it to the threshing apparatus comprising an upwardly and rearwardly extending belt-like conveyor for receiving the cut material from the pickup apparatus and delivering it to be threshed, means adjacent the elevated delivery end of the conveyor for redistributing the cut material on the conveyor for delivery from the conveyor comprising a pair of spiders having tine-like legs extending outwardly therefrom above the conveyor adjacent its upper end, means for rotating said spiders in opposite directions, said spiders being in the same plane at an angle to the plane of the conveyor whereby the legs of the spiders engage the material on the conveyor, loosen it and assist in conveying it toward the threshing apparatus.

4. A pickup and feeding apparatus for use with a combine for picking up a windrow, swath or shock of the cut crop from the ground and feeding it to the threshing apparatus comprising an upwardly and rearwardly extending belt-like conveyor for receiving the cut material from the pickup apparatus and delivering it to be threshed, means adjacent the elevated delivery end of the conveyor for redistributing the cut material on the conveyor for delivery from the conveyor comprising a pair of spiders having tine-like legs extending outwardly therefrom at an angle to the plane of the spiders above the conveyor adjacent its upper end, said spiders being mounted in the same plane at an angle to the plane of the conveyor whereby the legs of the spiders engage and loosen the material on the conveyor and assist in conveying it toward the threshing apparatus.

5. A pickup and feeding apparatus for use with a combine for picking up a windrow, swath or shock of the cut crop from the ground and feeding it to the threshing apparatus comprising an upwardly and rearwardly extending belt-like conveyor for receiving the cut material from the pickup apparatus and delivering it to be threshed, means adjacent the elevated delivery end of the conveyor for redistributing the cut material on the conveyor for delivery from the conveyor comprising a pair of spiders having tine-like legs extending outwardly therefrom above the conveyor adjacent its upper end, said spiders being mounted in the same plane at an angle to the plane of the conveyor, and means for rotating said spiders in opposite directions, such that the proximate legs of the two spiders move in the general direction of that of the adjacent portion of the conveyor the tine-like legs engaging and loosening the material on the conveyor and assisting in conveying it toward the threshing apparatus.

KENNETH L. MAGEE.

REFERENCES CITED

The following references are of record in the file of this patent:

UNITED STATES PATENTS

| Number | Name | Date |
| --- | --- | --- |
| 523,623 | Wright | Jan. 15, 1895 |
| 2,328,278 | Innes | Aug. 31, 1943 |
| 2,335,764 | Innes | Nov. 30, 1943 |